Figure 1:
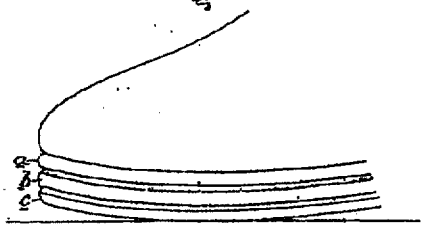

№ 3641 Reissued

Sep. 14 1869.

Michael Thornton,

Design for the Sole of a Boot or Shoe.

PATENTED
JUNE 1 1869

Witnesses { Wm. A. Steel
Jno. B. Harding

Michael Thornton

United States Patent Office.

MICHAEL THORNTON, OF PHILADELPHIA, PENNSYLVANIA.

*Design No.* 3,530, *dated June* 1, 1869; *reissue No.* 3,641, *dated September* 14, 1869.

DESIGN FOR THE SOLE OF A BOOT OR SHOE.

The Schedule referred to in these Letters Patent and making part of the same.

*To all whom it may concern:*

Be it known that I, MICHAEL THORNTON, of Philadelphia, county of Philadelphia, State of Pennsylvania, have originated a new Design for the Sole of a Boot or Shoe; and I do hereby declare that the accompanying drawing and the following explanation thereof form a full, clear, and exact description of the said design.

In the drawing—

Figure 1 is a side view of the sole of a boot or shoe, and

Figure 2:
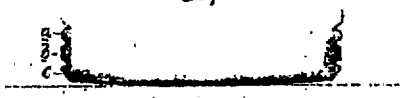

Figure 2, a transverse section of the sole, on which are formed three ribs, *a*, *b*, and *c*, in the manner clearly illustrated in the drawing.

These ribs and intervening grooves impart a light appearance to a thick sole.

I claim the design for the sole of a boot or shoe, substantially as described, and as represented in and by the accompanying drawing.

In testimony whereof, I have signed my name to this specification, before two subscribing witnesses.

Witnesses: MICHAEL THORNTON.

JOHN WHITE,

HARRY SMITH.